Figure 1:
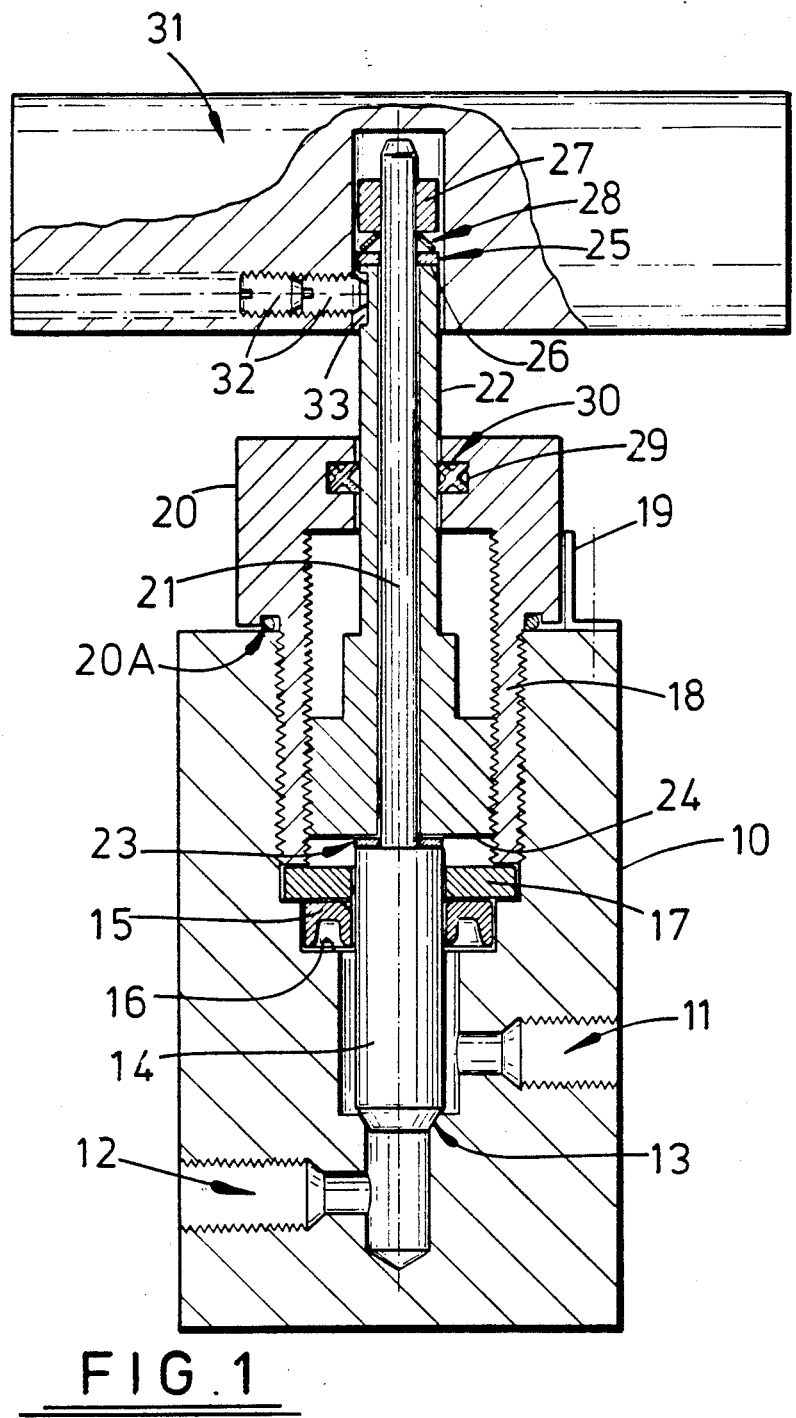

United States Patent [19]
Clayson

[11] Patent Number: 4,943,033
[45] Date of Patent: Jul. 24, 1990

[54] FLOW CONTROL VALVE

[75] Inventor: Andrew Clayson, Aberdeen, Scotland

[73] Assignee: Pacson Limited, Dundee, Scotland

[21] Appl. No.: 408,708

[22] Filed: Sep. 18, 1989

[30] Foreign Application Priority Data

Sep. 20, 1988 [GB] United Kingdom ............... 8822048

[51] Int. Cl.⁵ .................... F16K 31/50; F16K 1/48
[52] U.S. Cl. ................................. 251/88; 251/274; 251/322
[58] Field of Search ............ 251/88, 274, 322, 276

[56] References Cited

U.S. PATENT DOCUMENTS 3,049,332  8/1962  Webster ........................... 251/88
3,222,027 12/1965  Gilleeny ........................ 251/88 X
3,420,493  1/1969  Kraft ............................ 251/276 X
3,761,053  9/1973  Bedo et al. ..................... 251/88

FOREIGN PATENT DOCUMENTS 750176  5/1933  France ............................ 251/88

Primary Examiner—Arnold Rosenthal
Attorney, Agent, or Firm—Krass & Young

[57] ABSTRACT

In a high pressure needle valve, a central valve stem extends through a conventional operating sleeve for effecting axial shiftig of a valve head on the inner end of the stem. The outer end of the stem is plain to receive a push-fitted retainer, and a disc or flange spring compressed to approximately 60% is arranged between the retainer and the outer end face of the operating sleeve.

5 Claims, 1 Drawing Sheet

FLOW CONTROL VALVE

This invention relates to a flow control valve.

The invention is concerned especially, but not exclusively, with the structure of a high pressure needle valve.

In a known high pressure needle valve, a central valve stem is shifted axially, to open and close the valve, by means of a rotatable operating sleeve which is itself caused to shift axially by means of screw threads. Shifting of the sleeve in one axial direction thrusts the valve stem against a seat to close the valve; and in the opposite direction withdraws the stem from the seat. The withdrawal action is transmitted to the stem through a bearing washer, a retaining nut which is located on screw-threads formed at one end portion of the valve stem, and a lock-nut. Disadvantages of this structure are that fatigue fracture occurs at the root of a screw thread of the end portion of the valve stem; the structure is prone to unsatisfactory lost motion in the valve stem or excessive pre-load therein due to incorrect setting of the retaining and lock nuts; and the manufacturing costs attributable to forming the end-portion threads and providing and setting the retaining and lock nuts.

An object of the present invention is to provide a flow control valve in which one or more of the said disadvantages is/are obviated or mitigated.

SUMMARY OF THE INVENTION

According to the present invention, there is provided a flow control valve comprising a central valve stem having a valve head at one end thereof and a plain end portion at the other end thereof, a retaining member engaging said plain end portion by means of an interference fit, and an operating sleeve on said stem for shifting the stem axially to close and open the valve by acting respectively on said valve head and on said retaining member.

Figure 2:
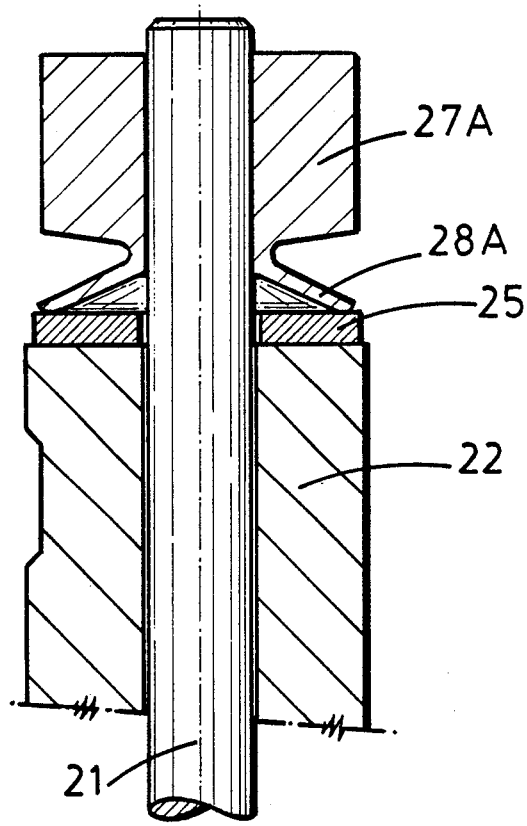

An embodiment of the present invention will now be described, by way of example, with reference to the accompanying drawings in which FIG. 1 is a sectional elevation of a high pressure needle valve in accordance with the present invention; and FIG. 2 is a sectional elevation of part of a modified valve in accordance with the present invention, and to a larger scale.

In FIG. 1 of the drawings, the high pressure needle valve consists of a valve body 10 provided with inlet/outlet ports 11, 12,15 between which the valve body defines a valve seat 13. A valve head or valve tip 14 is co-operable with the seat 13 for controlling fluid flow through the valve ports 11, 12. The valve head 14 is of cylindrical configuration and extends through an annular lip seal 15 arranged to isolate high pressure fluid from remaining parts of the valve. The seal 15 is accommodated in an annular chamber 16 one wall of which is defined by an annular insert 17 which is located and clamped by a bonnet member 18 which is internally and externally screw-threaded. The bonnet 18 is secured against unintentional slackening by means of a conventional locking tab 19 which engages a hex. head 20 of the bonnet 18. An 0-ring seal 20A is provided between the head 20 and the valve body 10. An extension of the valve head 14 consists of a central valve stem 21 which extends through an operating sleeve 22. A running fit is provided between the stem 21 and a central bore of the sleeve 22. An inner bearing washer 23 is provided between the valve head 14 and an inner face 24 of the operating sleeve 22. An outer bearing washer 25 is provided between an outer end face 26 of the sleeve 22 and a retainer 27 consisting of a sleeve which is pushfitted on to an outer plain end-portion of the stem 21; that is, the stem end portion and retainer bore diameters are dimensioned to engage by interference fit. A disc spring or Belleville washer 28 is disposed between the outer bearing washer 25 and the retainer 27 and the latter is positioned so that the disc spring 28 is compressed to approximately 60% of its maximum deflection, and some tensile pre-load is exerted on the stem 21. The compression of the disc spring 28 can usefully be in the range 30% to 80% of its maximum deflection. The arrangement is such that the sleeve 22 can rotate relative to the stem 21 without difficulty.

The head portion 20 of the bonnet 18 incorporates an annular recess 29 which accommodates a lip seal 30 for the purpose of isolating the interior of the bonnet 18 from external elements (for example, sea water etc.). The outer end portion of the sleeve 22 is engaged by an operating handle 31 carrying double locking screws 32 the inner end of which engages a flat 33 on the sleeve 22.

The inner end portion of the sleeve 22 is externally screw-threaded for engagement with the internal screw threads of the bonnet 18. Thus, rotation of the sleeve 22 causes axial shifting thereof which in turn effects axial shifting of the valve head and stem 14, 21.

In FIG. 2, parts corresponding with those in FIG. 1 are given the same reference numerals. The disc spring 28 is replaced by a spring flange 28A integral with the retainer 27A. The annular zone of the flange 28A for contact with the bearing washer 25 is machine-formed to provide rocking contact so to reduce the rate of wear of the bearing 25. The behaviour of the flange 28A is similar to that of a disc spring.

Modifications of the structures described, within the scope of the appended claims, include the following. The retainer 27 or 27A may be applied to the plain end portion of the stem 21 by means of heat-expansion of the retainer prior to fitting so that an interference fit is established on cooling. Alternatively, the plain end portion of the stem may be cooled prior to fitting the retainer. Alternatively, a sleeve retainer may be placed on the plain end portion of the stem 21 and cold-forged so that an interlocking tight engagement is established. Alternatively, the retainer may be fixed on the plain end portion of the stem 21 by means of a cement. The retainer may have a blind or stepped bore for receiving the stem 21. It is envisaged that the feature of the plain end portion of the stem 21 in these proposals be used without the presence of a compression spring such as the disc spring 28 or spring flange 28A.

By adopting the plain end portion on the stem 21, the risk of fatigue fracture at a screw-threaded root is eliminated; and manufacturing costs and assembly time are improved.

What is claimed is:

1. A flow control valve comprising a central stem having a valve head at one end thereof and a plain end portion at the other end thereof, a retaining member engaging said plain end portion by means of an interference fit, and an operating sleeve on said stem for shifting the stem axially to close and open the valve by acting respectively on said valve head and on said retaining member.

2. A flow control valve as claimed in claim 7, including a compression spring arranged on the stem between the retaining member and the operating sleeve.

3. A flow control valve as claimed in claim 2 wherein the compression spring is compressed in the range 30% to 80% of its maximum deflection.

4. A flow control valve as claimed in claim 2, wherein the compression spring is a disc spring.

5. A flow control valve as claimed in claim 2, wherein the compression spring is a flange integral with the retaining member.

* * * * *

UNITED STATES PATENT AND TRADEMARK OFFICE
CERTIFICATE OF CORRECTION

PATENT NO. : 4,943,033

DATED : July 24, 1990

INVENTOR(S) : Andrew Clayson

It is certified that error appears in the above-identified patent and that said Letters Patent is hereby corrected as shown below:

Column 3, line 1:

Claim 2, line 1, "claim 7" should be --claim 1--.

Signed and Sealed this

Seventh Day of January, 1992

Attest:

HARRY F. MANBECK, JR.

Attesting Officer

Commissioner of Patents and Trademarks